(12) United States Patent
Vonend (10) Patent No.: US 11,465,711 B2
(45) Date of Patent: Oct. 11, 2022

(54) TORQUE TRANSMISSION ASSEMBLY FOR A BICYCLE

(71) Applicant: SRAM DEUTSCHLAND GmbH, Schweinfurt (DE)

(72) Inventor: Andreas Vonend, Schweinfurt (DE)

(73) Assignee: SRAM DEUTSCHLAND GmbH, Schweinfurt (DE)

(*) Notice: Subject to any disclaimer, the term of this patent is extended or adjusted under 35 U.S.C. 154(b) by 368 days.

(21) Appl. No.: 16/841,876

(22) Filed: Apr. 7, 2020

(65) Prior Publication Data
US 2020/0324859 A1 Oct. 15, 2020

(30) Foreign Application Priority Data
Apr. 10, 2019 (DE) .................... 10 2019 002 638.1

(51) Int. Cl.
*B62M 9/121* (2010.01)
*B62M 9/00* (2006.01)

(52) U.S. Cl.
CPC .............. *B62M 9/121* (2013.01); *B62M 9/00* (2013.01)

(58) Field of Classification Search
CPC ............................... B62M 9/121; B62M 9/00
USPC .......................................................... 474/152
See application file for complete search history.

(56) References Cited

U.S. PATENT DOCUMENTS 10,151,378 B2 12/2018 Reineke et al.
10,377,445 B2 8/2019 Hirose et al.

FOREIGN PATENT DOCUMENTS

DE 102012009961 11/2013
DE 102017008222 3/2018
EP 3064425 9/2016

*Primary Examiner* — Gene O Crawford
*Assistant Examiner* — Emily Rose Kincaid (57) ABSTRACT

The disclosure relates to a torque transmission assembly for a bicycle. The torque transmission assembly includes an adapter device and a driving body that is rigidly connectable to the adapter device in a torque transmitting manner. The adapter device has three support arms that extend with a radial direction component, and the driving body has a corresponding number of support cutouts. The support arms are received in the support cutouts forming a press fit. The torque transmission assembly is characterized in that the press fit of the support arms and support cutouts has two fitting planes, which are parallel to one another and to an imaginary plane containing the axis of rotation of the assembly. There is a clearance between the support arm and support cutout along the radial direction component.

17 Claims, 9 Drawing Sheets

TORQUE TRANSMISSION ASSEMBLY FOR A BICYCLE

PRIORITY

This application claims priority to, and/or the benefit of, German patent application DE 10 2019 002 638.1, filed on Apr. 10, 2019, the contents of which are included by reference herein in their entirety.

BACKGROUND

The present disclosure relates to a torque transmission assembly for a bicycle, and to a method for producing a torque transmission assembly.

In the drivetrain and at other points on a bicycle, for example in the region of disc brakes, torque needs to be transmitted. The amount of torque to be transmitted can sometimes turn out to be very high. Thus, the drive torque or braking torque that arise in the region of the hubs in the case of bicycles can easily reach medium to high three-digit newton meter ranges. High torque also arises in the region of the bottom bracket at the connection between the crank and chainring, depending on the rider's weight and position.

These torques result in correspondingly high forces to be transmitted. The torques are particularly high at the interfaces between rotationally loaded assemblies, such as: at the transition between a sprocket and a spider, at the transition between a bicycle crank and a chainring spider arranged there, at the transition between a sprocket or sprocket spider and an associated freewheel driver of a rear wheel, at the transition between a brake disc and a spider carrying the brake disc, or between the brake disc spider and bicycle hub.

At these interfaces, the forces to be transmitted are naturally greater when the diameter of the corresponding interface between the respective rotationally loaded assemblies is smaller. Accordingly, it is generally known to use softer and/or thinner materials for components arranged radially further out, for example spiders or sprockets, since correspondingly lower forces and loads arise radially further out. Similarly, correspondingly harder and/or thicker materials are used for components arranged radially further in, for example for the radially internal regions of spiders.

High loads and correspondingly high demands exist in particular in the region of such transitions between components or component regions in which thinner and/or softer components adjoin thicker and/or harder components, or in which such components are intended to be connected together.

Figure 1:
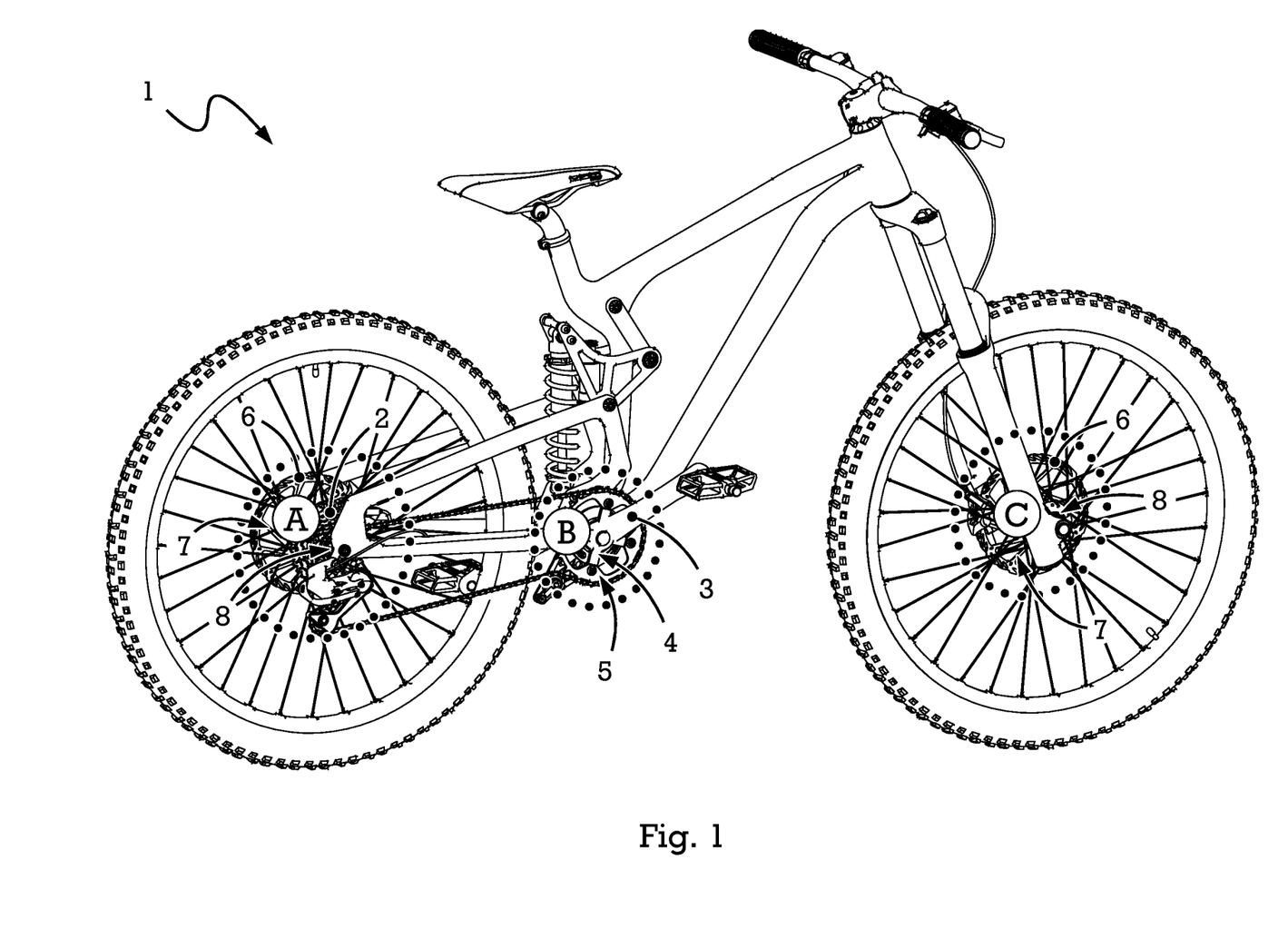
FIG. 1 shows a bicycle having torque transmitting assemblies in the drivetrain and brake assembly.

The document EP3064425B1 discloses, for example in FIG. 1d, a torque transmission assembly in the form of a bicycle sprocket with an adapter. Therein, the material of the sprocket is comparatively thin, while the adapter, which is produced separately and from a different material from the sprocket, has a relatively high material thickness compared with the sprocket. In this document, the adapter is connected to the sprocket in that cylindrical rivet protrusions that are arranged on the adapter around the circumference of an imaginary pitch circle are pressed into corresponding bores in the sprocket, wherein the sprocket bores are arranged around the same pitch circle circumference as the protrusions on the adapter.

In that case, however, during production, the problem can arise that the diameter of the pitch circle at the circumference of which the rivet protrusions of the adapter are arranged differs unintentionally from that pitch circle diameter at the circumference of which the bores in the sprocket are arranged. This can occur for example on account of manufacturing tolerances of the sprocket and/or of the adapter, or for example on account of warpage or contraction that can arise for instance during the hardening of the adapter.

In any case, such differences in the pitch circle diameter of the sprocket and/or adapter, on the circumferences of which the rivet protrusions and bores, respectively, are arranged, or any roundness errors of one or both of these pitch circles can result in the connection between the sprocket and adapter not achieving the desired strength. Similarly, difficulties in the form of excessively high press-in forces during the pressing together of the sprocket and adapter can arise, and ultimately undesired radial distortion forces that result therefrom can cause warpage of the unit made up of the sprocket and adapter, and thus correspondingly impaired true running of the sprocket. All of this can increase the production costs or result in more scrap during production.

SUMMARY

According to one embodiment, a torque transmission assembly for a bicycle includes an adapter device having support arms extending with a radial direction component, and a driving body rigidly connectable to the adapter device in a torque transmitting manner, the driving body including complementary support cutouts of complementary position and shape to the support arms. The support arm of are received in the support cutouts of the driving body, forming a press fit. The press fit of the support arm and the support cutout have two fitting planes which are parallel to one another and to an imaginary plane containing the axis of rotation of the torque transmission assembly. A clearance exists between the support arm and support cutout along the radial direction component.

According to one embodiment, a method for producing a torque transmission assembly includes producing a driving body and an adapter device such that first fitting surfaces of support arms form an interference fit at least in the tolerance zone range S to Z with second fitting surfaces of driving body support cutouts. Next, positioning the adapter device and the driving body axially on top of each other along an assembly axis of rotation such that the support arms cover the driving body support cutouts, and next pressing the adapter device and the driving body together along the assembly axis of rotation, with a chip formation at the first and the second fitting surfaces.

BRIEF DESCRIPTION OF DRAWINGS

Other aspects and advantages of the embodiments disclosed herein will become apparent upon consideration of the following detailed description, wherein similar or identical structures have similar reference numerals.

DETAILED DESCRIPTION

It is the object of the present disclosure to provide an assembly for connecting rotary components on the bicycle in a torque transmitting manner, with which the abovementioned drawbacks are overcome. This object is achieved by a torque transmission assembly having the features described below.

To achieve the abovementioned object, the proposed torque transmission assembly comprises an adapter device, the function of which can be considered to be analogous to the abovementioned adapter from the document EP3064425B1, and at least one driving body that is rigidly connectable to the adapter device in a torque transmitting manner. The above-discussed sprocket from the document EP3064425B1 can be used as a non-limiting example, serving only for increasing understanding, of a driving body.

In the present disclosure, the adapter device has a plurality of at least three support arms that each extend with a radial direction component, and the at least one driving body has a corresponding plurality of support cutouts, which are of complementary position and shape to the support arms of the adapter device. Thus, in each case one support arm of the adapter device may be received in one support cutout of the driving body, forming a press fit. In this way, the adapter device and driving body are firmly connectable together by being pressed together.

According to the disclosure, the torque transmission assembly is characterized in that the press fit formed by the support arm and support cutout has two fitting planes, which are parallel to one another and to an imaginary plane containing the axis of rotation of the torque transmission assembly, wherein there is a clearance between the support arm and support cutout along the radial direction component. The press fit between the adapter device and the at least one driving body, and thus the relative position of the support arm and support cutout, is fixed in a form-fitting manner only in the circumferential direction, with respect to the axis of rotation of the assembly. By contrast, there is no fixed assignment of the position of the support arm and support cutout as regards to a radial direction component on account of the abovementioned clearance.

The press fit between the adapter device and the at least one driving body is not dependent on the observance of corresponding pitch circles, as is the case in the references described at the beginning. The expression "radial direction component" is used herein since the support arms of the adapter device do not have to be oriented strictly radially, but can also be arranged for example in a cupped, or in a somewhat spiral or oblique manner, with respect to the radial direction. In such cases, the longitudinal axis of each support arm can have, apart from a radial direction component, a direction component that is axial and/or extends in a circumferential direction with respect to the axis of rotation of the assembly.

By virtue of the clearance, when the adapter device and driving body are pressed together, any imprecisions at least along the radial direction component, which can occur for example during the production and/or heat treatment of one or both parts, no longer have the effect, as in the prior art, that unfavourable or imprecise coverage of the parts to be pressed together occurs, with the above-described, undesired consequences, for example a great increase in the pressing force or warpage of the parts pressed together.

The proposed torque transmission assembly is not limited to the transmission of drive torques between different components of a bicycle drivetrain but can also be used for example to transmit braking torques between different components or assemblies of a bicycle brake (e.g., a disc brake).

According to an embodiment, the above mentioned imaginary plane, which contains the axis of rotation of the assembly, is not only parallel to the fitting planes or fitting surfaces of the support arm and support cutout, but also represents a center plane with respect to the two fitting planes defined by these fitting surfaces. This means that the support arms extend substantially in a radial direction, with respect to the axis of rotation of the assembly, and thus, in this embodiment, not for instance in an oblique or spiral manner with respect to this axis of rotation. Any cupping of the adapter device and/or driving body, optionally including in the region of the support arms, remains possible in this embodiment too, however.

According to an embodiment, the adapter device is formed in one piece and comprises a carrier body, arranged radially further in, and support arms formed in one piece with the carrier body. In this case, the support arms project radially outwards in the region of the outer circumference of the carrier body. The support arms are thus configured and arranged in this embodiment such that they can engage in corresponding support cutouts of a driving body arranged radially further out, with the result that the firm and torque transmitting connection between the adapter device and driving body is established.

In another embodiment, the adapter device is formed in one piece and comprises a carrier body arranged radially further out, and support arms formed in one piece with the carrier body. In this case, the support arms project radially inwards in the region of the inner circumference of the carrier body. In this embodiment, the support arms are configured and arranged such that they can engage in corresponding support cutouts of a driving body arranged radially further in. This results in the firm and torque transmitting connection between the adapter device and driving body.

The adapter device, in particular a one-piece adapter device, can also be configured such that the support arms project both regionally radially outwards and regionally radially inwards. In this way, it is then possible for example for a driving body to be arranged in each case both radially internally and radially externally with respect to the adapter device, and to be connected to the adapter device.

According to another embodiment, the support arms of the adapter device are arranged on a carrier surface at least along a part of their length, and may be formed in one piece therewith. The carrier surface can be present instead of the abovementioned carrier body, or in addition to such a carrier body.

In this way, the support arms may be reinforced, and additional abutment arises between the at least one driving body and the adapter. As a result, the true running can be improved, and higher tilting moments between the driving body and adapter can be absorbed. This can be significant on a bicycle when the chain skew that arises for example in particular gears of a derailleur gear system has to be taken into account. In addition to the rotary load of the connection between the sprocket and adapter, the chain skew also generates considerable tilting moments, wherein the reference axis of these tilting moments runs at right angles to the axis of the torques introduced by rotation.

According to another embodiment, the torque transmission assembly has two, a first and a second, driving bodies that are arrangeable coaxially with one another, or one inside the other, and with a radial spacing between one another, and are each provided with the at least three support cutouts described above. At the same time, in this embodiment, the adapter device is in the form of a plurality of individual, separate cuboid pegs, such that each cuboid peg engages with a first end in a support cutout of the first driving body, which is arrangeable radially internally, and with its other end in a support cutout of the second driving body, which is arrangeable radially externally.

The cuboid pegs may not be cuboidal. Rather, the cuboid pegs may be formed in a substantially prismatic manner, or have at least two mutually opposite parallel surfaces, which form the fitting planes or fitting surfaces that are pressed together with the corresponding counterpart fitting surfaces of the driving bodies.

In a variant of the abovementioned embodiment, the driving body that is arrangeable radially internally is a freewheel driver for a bicycle rear hub. A similar variant arises when, in the above-described embodiment with a one-piece adapter device and with radially inwardly projecting support arms, a freewheel driver is provided as driving body. In these variants, a direct, torque transmitting and firm connection thus arises between an adapter and a freewheel driver of a bicycle rear hub.

In an alternative embodiment, the adapter device has a torque transmission interface arranged radially on the inside, for example a toothing or spline. Via the torque transmission interface, the adapter device can be connected in a torque transmitting manner for example to a freewheel driver of a bicycle rear hub. Other possible uses for an adapter device having a torque transmission interface on the inside exist for example in the region of the bottom bracket crank or at the connection of brake discs to bicycle hubs on the front or rear wheel of a bicycle.

In an embodiment (in the case of a one-piece adapter device), the adapter device is formed in a cupper manner such that imaginary center planes (arranged orthogonally to the assembly axis of rotation) of the carrier body and of the support arms of the adapter device are arranged in a manner spaced apart from one another along the assembly axis of rotation. This embodiment is useful when a driving body that is formed in a substantially flat manner in the region of the support cutouts and has circumferentially closed support cutouts is used, as is described further below.

According to a another embodiment, the at least one driving body is formed in a cupped manner such that the driving body fitting planes and the radially inner runout of the driving body support cutouts are arranged in a manner spaced apart from one another along the assembly axis of rotation. This embodiment is employed when a substantially flat adapter is intended to be used together with a driving body having circumferentially closed support cutouts, as described below.

A combination of an adapter device formed in a cupped manner with a driving body likewise formed in a cupped manner can also be provided.

According to another embodiment, the support cutouts of the at least one driving body are circumferentially closed. This embodiment is preferably combined either with a driving body formed in a cupped manner in the region of the support cutouts or with an adapter formed in a cupper manner, as described above. Circumferentially closed support cutouts of the at least one driving body entail a greater stiffness of the driving body in the region of the support cutouts, and thus provide a greater torque transmission capacity.

In another embodiment, a driving body that is arranged radially externally with respect to the adapter device is a spider for receiving at least one chain wheel of a bicycle drivetrain. This can be for example a cassette spider, which is used at the large sprockets of a sprocket cassette for bicycle derailleur gear systems. The spider can likewise be a crank spider for torque transmission in the region of a bicycle crank.

According to another embodiment, a driving body that is arranged radially externally with respect to the adapter device is a chain wheel of a bicycle drivetrain. In this embodiment, a sprocket or chainring for a bicycle drivetrain can be pressed together directly with an adapter, without a spider being arranged radially between the chain wheel and the adapter.

The adapter device has five support arms, and the at least one driving body correspondingly has five support cutouts. It has been found that the number of five support arms and support cutouts fulfils the requirement profile in terms of centring effect, producibility and torque transmission effectively, wherein, at the same time, there is good conformity with existing spiders, which are often embodied in a five-armed manner.

In embodiments, the material hardnesses of the adapter device and driving body are different, at least in the region of the fitting planes or fitting surfaces. Either the driving body can be harder than the adapter device or, conversely, the adapter device can be harder than the driving body. When the adapter device and driving body are pressed together, a high level of process reliability can be achieved in that the desired material removal during the pressing operation always takes place in a defined manner on one of the two parts.

The disclosure also relates to a method for producing a torque transmission assembly as described above. The method comprises the method steps set out below.

In an initial method step, at least one driving body and one adapter device are produced such that the fitting planes of the support arms and the fitting planes of the driving body support cutouts together form an interference fit at least in the tolerance zone range S-Z. This requirement for the interference fit results from the need to ensure that when the adapter device is pressed together with the at least one driving body, a defined punching action or chip formation takes place at least on one of the two fitting parts on account of the considerable oversize.

In a method step, the adapter device and driving body are then positioned one axially on top of the other along the assembly axis of rotation such that the support arms cover the support cutouts.

Finally, in a method step, the adapter device and driving body are pressed together along the assembly axis of rotation, wherein desired burr or chip formation takes place in the region of the fitting planes or fitting surfaces.

The method described herein may include at least one of the two parts being pressed together, i.e., either the adapter device or the driving body, simultaneously forming a punching or frictional tool for finishing the fitting surfaces of the respectively other part.

When the two parts are being pressed together, a final punching or frictional operation takes place at the same time, in which the respectively harder part finishes the fitting surfaces of the respectively softer part exactly in a fitting manner such that the desired press fit and thus the firm connection between the two parts arises in a dimensionally and positionally accurate manner.

Automatic self-centring of the two parts or assemblies to be pressed together takes place at the same time, irrespective of whether or not they were positioned exactly with respect to one another, in a radial direction with respect to the axis of rotation of the assembly, before the pressing operation, and irrespective of whether there are any inaccuracies in the shape, orientation and/or dimensions of the support arms or of the support cutouts. The method according to the disclosure is thus particularly fault-tolerant, but at the same time ensures always exactly coaxial orientation of the parts to be pressed together after they have been pressed together.

Individual embodiments of the present disclosure are illustrated by way of example in the following text with reference to the schematic drawings.

FIG. 1 shows a full-suspension mountain bike bicycle.

Generally, in bicycles high to very high torques arise and need to be transmitted in the drivetrain and also, for example, in the region of disc brakes. Thus, the drive torques and braking torques that arise in the region of the hubs, i.e. at "A" and "C" in FIG. 1, sometimes reach medium to high three-figure newton meter ranges. In the region of the bottom bracket "B", too, high to very high torques arise in the region of the connection between the crank and chainring, depending on the rider's weight and the riding situation.

These torques bring about, in a corresponding manner, high forces to be transmitted at the interfaces between rotationally loaded torque transmission assemblies, for example, in the regions "A", "B" and "C" on the bicycle. The interfaces within such torque transmission assemblies include for example the transitions between a sprocket 10 on a sprocket cassette 2 and a sprocket spider 12 carrying the sprocket 10 (cf. FIGS. 2-3), between a bicycle crank 3 and a chainring spider 4 or between a chainring spider 4 and a chainring 5, between a sprocket 10 or sprocket spider 12 of a sprocket cassette 2 and an associated freewheel driver 12a (cf. FIG. 12), at the transition between a brake disc 6 and a brake disc spider 7 that carries the brake disc 6 and is optionally separate from the brake disc 6, or between a brake disc spider 7 and a bicycle hub 8.

The forces required for transmitting the braking or drive torques within the torque transmission assembly in question naturally become greater in this case, the smaller the diameter of the corresponding interface between the rotationally loaded components mentioned above by way of example.

Figure 2:
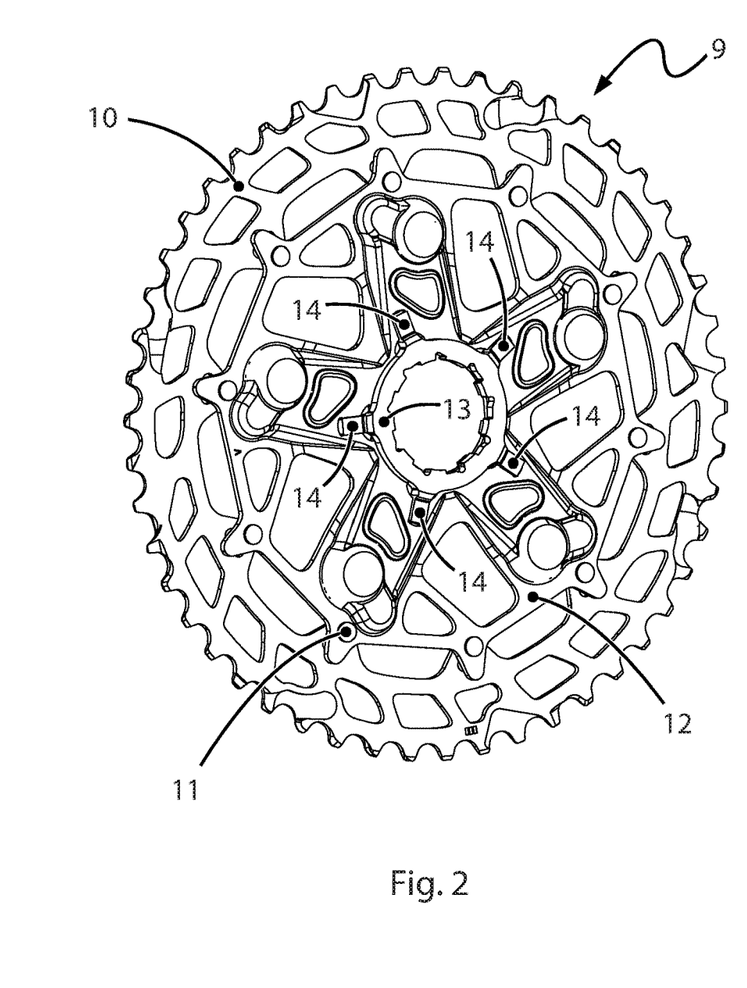
FIG. 2 shows an exemplary embodiment of a torque transmission assembly having an adapter device (referred to below in a simplified manner as "adapter"), a driving body and sprocket in an oblique front view.
Figure 3:
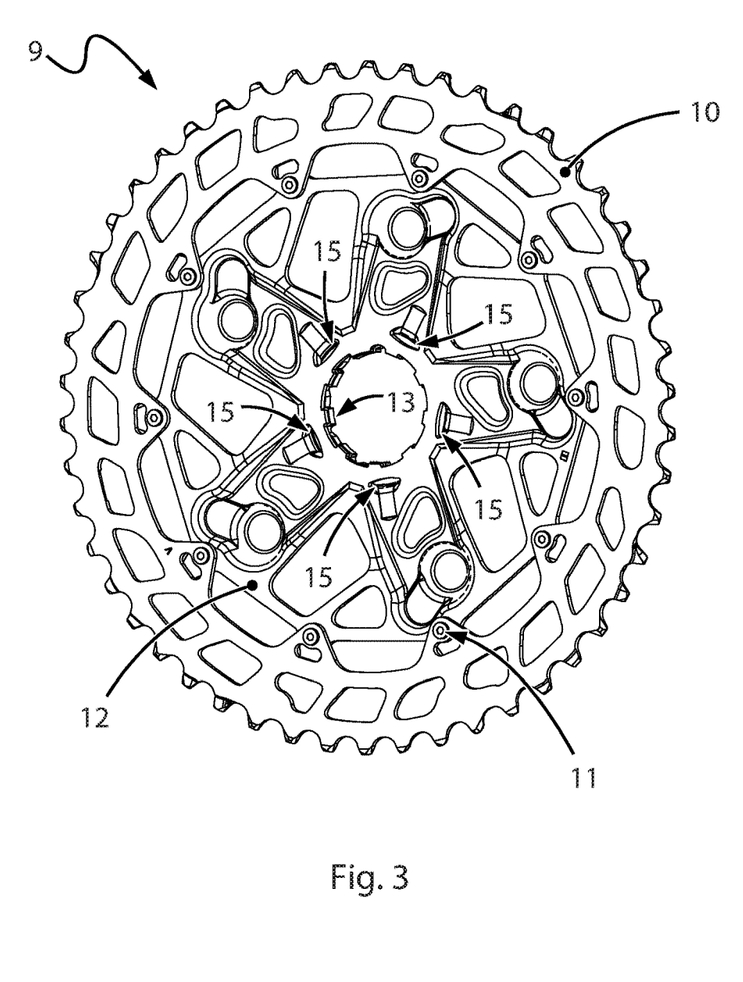
FIG. 3 shows the torque transmission assembly according to FIG. 2 in an oblique rear view.

FIGS. 2 and 3 show an embodiment of a torque transmission assembly 9 according to the present disclosure.

Initially, a chain wheel 10 is apparent, which in the present case is a sprocket 10 of a multi-sprocket cassette 2 (cf. FIG. 1) for a bicycle 1. The sprocket 10 is fastened to a driving body 12 by riveted connections 11, wherein the driving body 12 corresponds here to a sprocket spider.

In addition to the driving body 12, an adapter 13 can be seen. The adapter 13 has five substantially radially extending support arms 14, which are received in support cutouts 15 of complementary shape of the driving body 12, such that a torque transmitting rigid connection between the adapter 13 and driving body 12 results.

Figure 4:
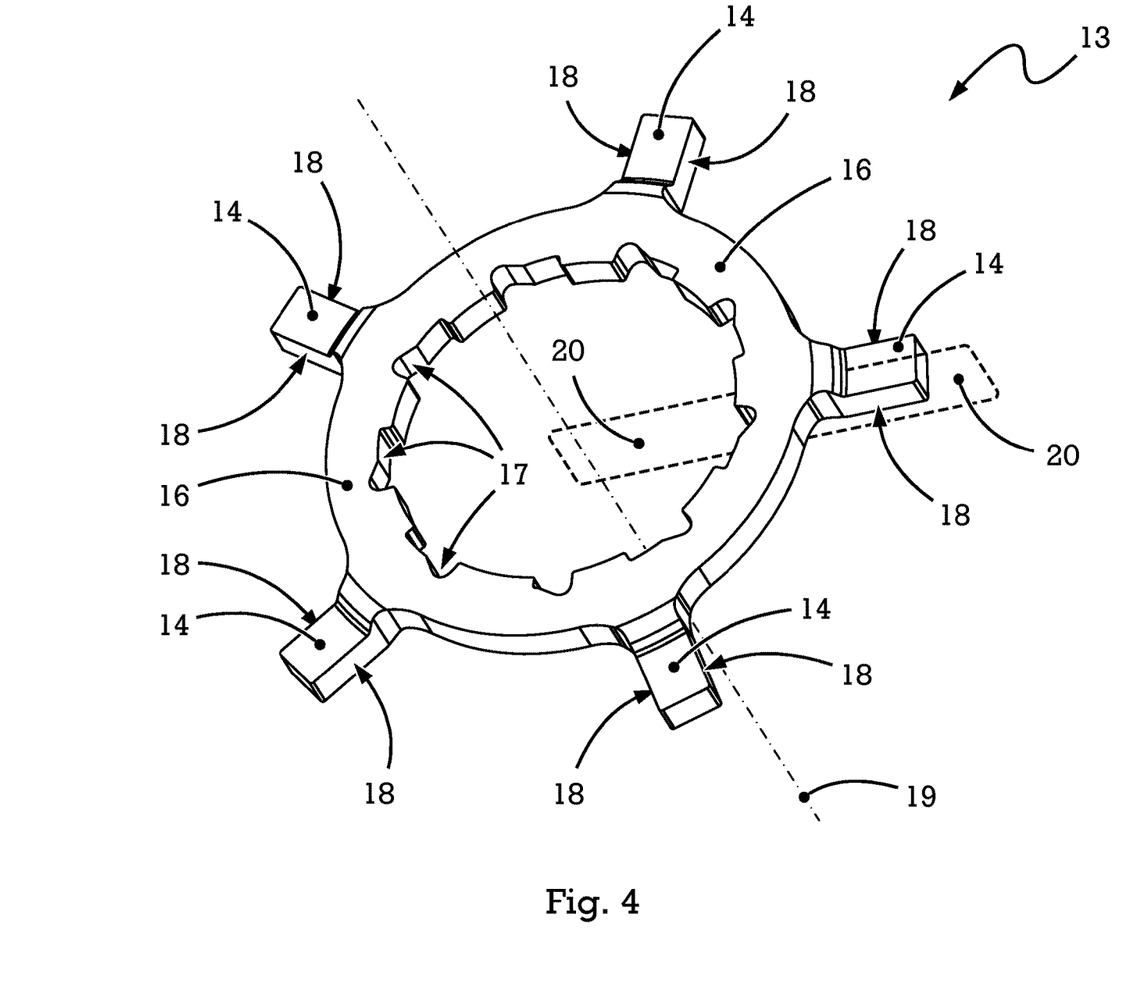
FIG. 4 shows the adapter according to FIGS. 2 and 3 in a separate illustration.

In FIG. 4, the adapter 13 with its five support arms 14 is illustrated separately. It is apparent that the adapter 13 is formed in one piece and, in addition to the support arms 14, has a substantially annular carrier body 16. The carrier body 16 is in this case provided on its radially inner side with a torque transmission profile 17, which serves for example to transmit drive torques to a freewheel driver 12a (not illustrated here) (cf. FIG. 12) of a rear hub 8 of a bicycle 1.

The support arms 14 of the adapter 13 each have two fitting planes or fitting surfaces 18. The two fitting surfaces 18 of each support arm 14, or the imaginary fitting planes that are defined by the fitting surfaces 18, are in this case parallel to one another and to an imaginary plane 20 containing the axis of rotation 19 (which corresponds to the axis of rotation 19 of the torque transmission assembly 9, cf. FIGS. 2, 3, and 12) of the adapter 13. The imaginary plane 20, which is a center plane between the two fitting planes 18, i.e. a plane that is parallel to each of the two fitting planes 18 and is the same distance from each of the two fitting surfaces 18, is indicated in FIG. 4 by a dashed line.

Figure 5:
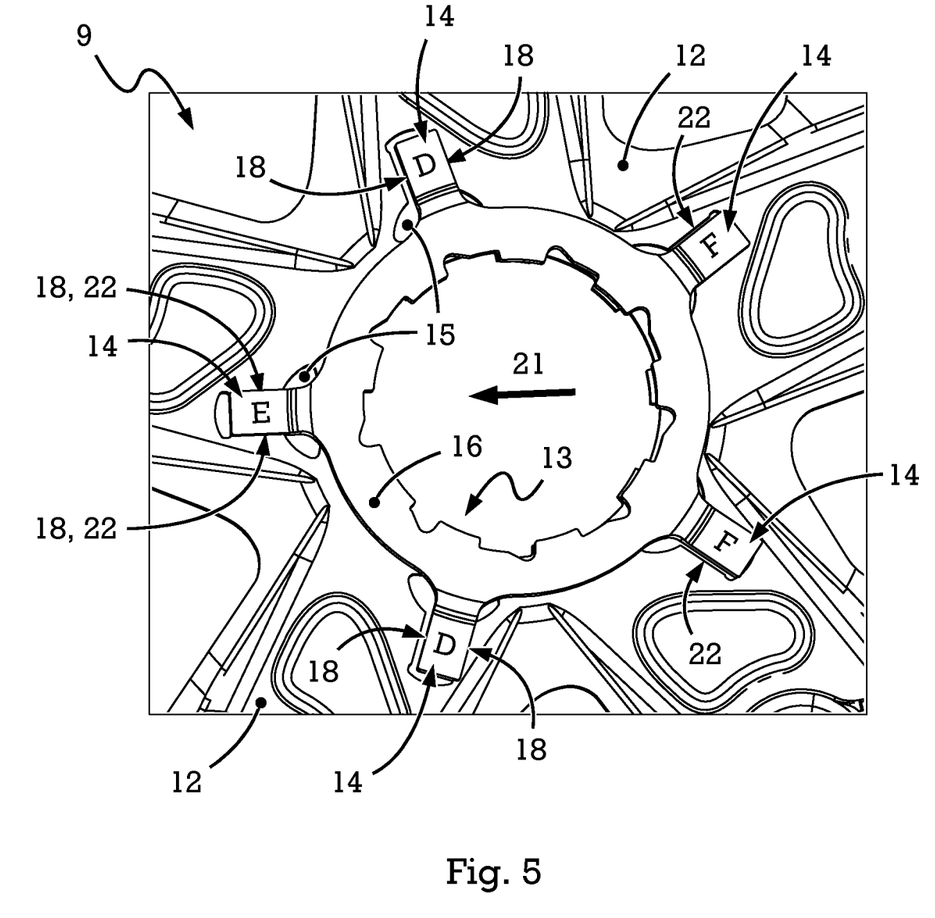
FIG. 5 shows an enlarged detail illustration of the driving body and adapter of the torque transmission assembly according to FIGS. 2 to 4.

FIG. 5 shows an enlarged detail illustration of the adapter 13 and the driving body 12 (i.e., in the present case, a sprocket spider of a sprocket cassette 2, for example according to FIGS. 2-3) in a situation shortly before the driving body 12 and adapter 13 are joined or pressed together. It is apparent that the ends of the support arms 14 of the adapter 13 are already arranged immediately in the region of the support cutouts 15 of the driving body 12.

In the illustration in FIG. 5, the adapter 13 is deliberately not arranged concentrically with the driving body 12, but rather displaced somewhat along the horizontal, counter to the arrow direction 21, to the right in the figure. For the sake of clarity, the size of the displacement is illustrated in a highly exaggerated manner.

The displacement 21 illustrated in FIG. 5 is intended to illustrate an inaccuracy or tolerance, which arises between the driving body 12 and adapter 13 before or during the joining process, during the concentric positioning of the driving body 12 and adapter 13, in advance of the pressing together of the driving body 12 and adapter 13.

Considering that the tolerance or displacement 21 during the actual joining process turns out to be much smaller than illustrated in FIG. 5, it is clear how the driving body 12 and adapter 13 orient themselves concentrically with one another automatically during the pressing operation.

This takes place in that the fitting surfaces 18 of the support arms 14 are forced between the corresponding counterpart fitting surfaces 22 (cf. FIG. 6) during the pressing together of the driving body 12 and adapter 13, with the result that the adapter 13 moves in the arrow direction 21 and accordingly is brought into a concentric position with the driving body 12.

In this case, the support arms 14 indicated by the letter "D" in FIG. 5 and, to a lesser extent, also the support arms 14 indicated by the letter "F" cooperate with regard to the generation of the movement or force, to the left in the drawing, necessary for the displacement 21. By contrast, in the illustrated example, in particular the support arm 14 indicated by the letter "E" and, to a lesser extent, also the support arms 14 indicated by the letter "F" act for the purpose of parallel guidance between the driving body 12 and adapter 13. This parallel guidance takes place in that the fitting surfaces 18 of the respective support arms 14 of the adapter 13 can slide along the corresponding counterpart fitting surfaces 22 (cf. FIG. 6).

Figure 6:
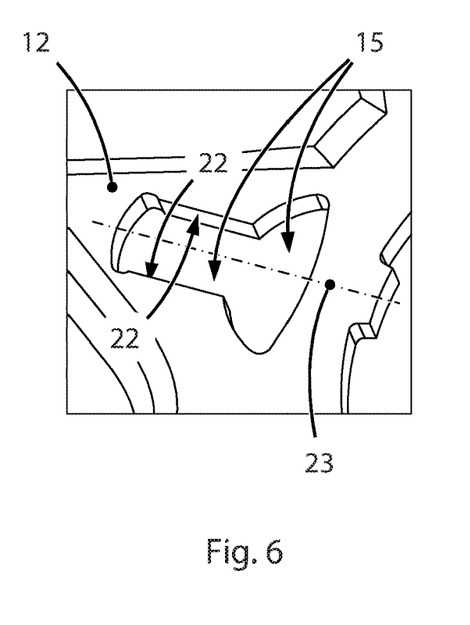
FIG. 6 shows a more enlarged illustration of a support cutout of the driving body of the torque transmission assembly according to FIGS. 2 to 5.
Figure 7:
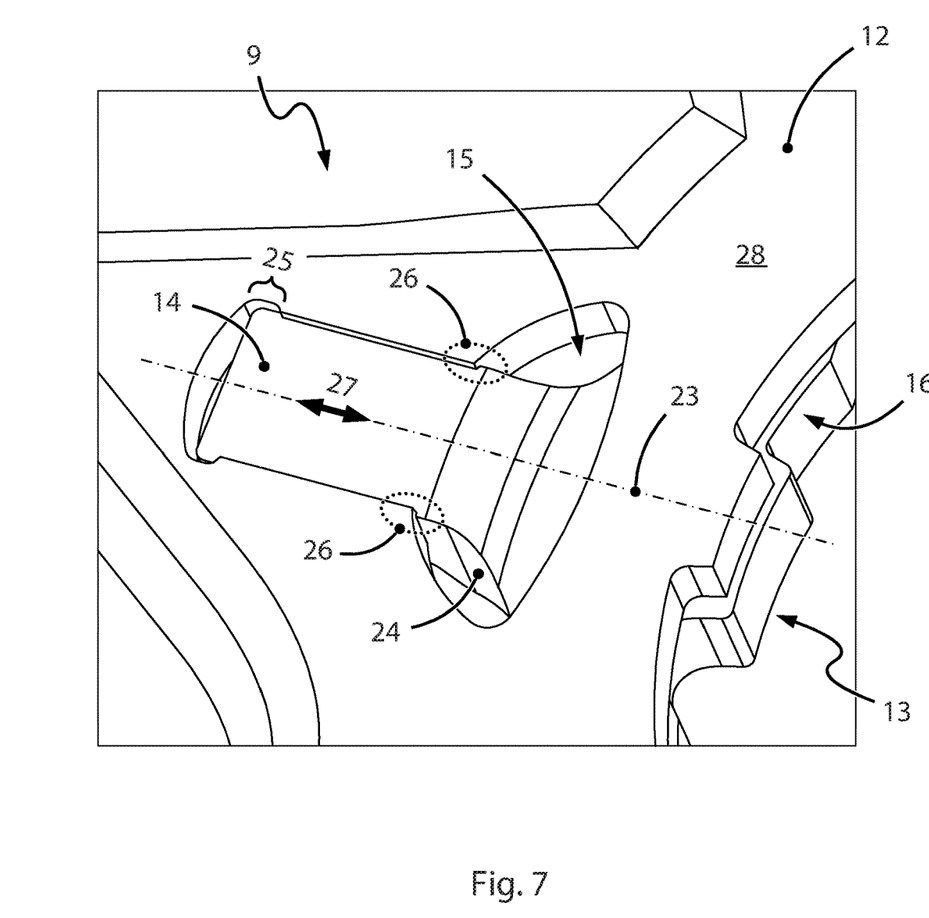
FIG. 7 shows an even more enlarged illustration of the support cutout according to FIG. 6 with a support arm of the adapter arranged therein.

This connection becomes even more particularly apparent in the enlarged illustrations according to FIGS. 6 and 7. FIGS. 6 and 7 each show enlarged details of FIG. 5, wherein the viewing direction in FIGS. 6 and 7 corresponds to a rear direction compared with the illustration in FIG. 5.

FIG. 6 shows one of the five support cutouts 15 of the driving body 12 (i.e., for example of a sprocket spider of a sprocket cassette 2 according to FIGS. 2-3). It is apparent that the support cutout 15 has counterpart fitting surfaces 22 on its inner side, the counterpart fitting surfaces 22 being configured to receive the lateral fitting surfaces 18 (cf. FIGS. 4-5) arranged on the support arms 14 of the adapter. FIG. 7 shows the enlarged drawing detail of FIG. 6, where the adapter 13 is illustrated in its final, pressed-together position relative to the driving body 12 in FIG. 7.

It is apparent from FIG. 7 that there is a clearance 25 between the support arm 14 and support cutout 15 in the radial direction 23, with regard to the axis of rotation 19 (cf. FIG. 4) of the torque transmission assembly 9 (cf. FIGS. 2-3). Because of the clearance 25, the press connection between the driving body 12 and adapter 13 is independent of a particular pitch circle diameter on which the fitting surfaces have to be arranged as previously described.

Rather, the fitting surfaces of the driving body 12 and adapter 13 according to the present disclosure are also located on pitch circles that have different sizes or are non-round, which can occur at any time on account for example of manufacturing tolerances or hardening warpage on one or both parts, without this impairing the joining process, the quality of the join, or the true running of the joined parts. Rather, on account of the clearance 25, freely variable relative positioning 27 of the support arm 14 and support cutout 15 within the scope of the clearance 25 is possible before and during the pressing operation.

As is apparent from FIG. 4, the radial direction 23 is the only direction component of the support arms 14 of the adapter 13, since the support arms 14, apart from their base region 24, which is offset or extends in a cupped manner, are arranged in a common plane. The support arms 14 extend, in the illustrated exemplary embodiment, apart from their base region 24, in radial directions with respect to the axis of rotation 19 of the assembly 9, and in this case have in particular no axial and/or circumferentially extending direction components, as can be the case for example in support arms that extend in a cupped or somewhat spiral manner, such support arms likewise being encompassed by the present disclosure.

It is also apparent from FIG. 7 that the press fit between the fitting surfaces 22 (FIG. 6) of the support cutouts 15 of the driving body 12 and the fitting surfaces 18 (FIG. 4) of the support arms 14 of the adapter 13 forms the burr formation 26 during the pressing together of the driving body 12 and adapter 13. This formation of the bur formation 26 id discernible at points 26 in FIG. 7 highlighted by dotted lines. The burr formation 26 means in other words that, while the support arms 14 of the adapter 13 are being pressed into the support cutouts 15 of the driving body 12, controlled subtractive material removal takes place.

This takes place in a reproducible manner when the driving body 12 and adapter 13 have different material hardnesses. Thus, it is possible, for example for the driving body 12, when it is a sprocket spider of a sprocket cassette, to consist of a softer material than the adapter 13, which can consist for example of hardened steel. In this case, the adapter 13 additionally acts, while it is being pressed into the support cutouts 15 of the driving body 12, as a punching or frictional tool, which finishes the fitting surfaces 22 of the support cutouts 15 of the driving body 12 at the same time as the pressing operation.

This also works the other way around (i.e., when the material hardness of the driving body 12 is greater than that of the adapter 13). In this case, the fitting surfaces 22 of the support cutouts 15 of the driving body 12 form a punching or frictional tool, which again finishes the fitting surfaces 18 of the support arms 14 of the adapter 13 during the pressing operation.

This mutual finishing of the fitting surfaces on the respectively other part is advantageous inasmuch as the requirements for manufacturing or fitting accuracy of at least one of the two parts, and thus the manufacturing costs, can be reduced as a result. Similarly, this results in particularly good reproducibility of the press fits between the driving body 12 and adapter 13, and thus produces less waste during manufacturing, and also results in a reduction in components possibly failing during subsequent operation.

It is also apparent from viewing FIG. 7 and FIGS. 2 to 4 together that the adapter 13 in this case has a cupped shape inasmuch as an imaginary center plane of the carrier body 16 is arranged at a distance from an imaginary center plane of the support arms 14 along the assembly axis of rotation 19. This has the result that the support arms 14 and the support cutouts 15 of the driving body 12, in the pressed-together state of the driving body 12 and adapter 13, are located substantially in the same plane with respect to the assembly axis of rotation 19, whereas the carrier body 16 of the adapter 13, and also the torque transmission profile 17 arranged on the inner side of the carrier body 16 in this case, are located outside this then common plane of support arms 14 and support cutouts 15.

This is apparent from the illustration in FIG. 7 in that the carrier body 16 of the adapter 13 is located beneath the surface region 28 of the driving body 12 in the drawing, while the support arms 14 pressed into the support cutouts 15 are positioned substantially at the same height as this surface region 28 of the driving body 12 in the drawing.

This cupped design of the adapter 13 is advantageous inasmuch as it makes it possible to configure the support cutouts 15 of the driving body 12 in a completely closed manner, this being particularly apparent from FIGS. 6 and 7, but also being shown in FIG. 3. This completely closed configuration of the support cutouts 15 of the driving body 12 increases the structural stiffness of the driving body 12 in the region of the support cutouts 15, and as a result allows, inter alia, high surface pressure between the fitting surfaces 18 and 22 of the adapter 13 and driving body 12. This in turn results in a highly loadable press connection of the adapter 13 and driving body 12.

FIGS. 8A-8D shows a schematic illustration of an alternative embodiment of a torque transmission assembly 9. Here too, a driving body 12 and an adapter 13 are apparent, wherein the driving body 12 again has support cutouts 15 and the adapter 13 again has support arms 14. The main difference from the above embodiment of FIGS. 2 to 7 is that the support arms 14 of the adapter 13, in the present embodiment according to FIGS. 8A-8D, protrude scarcely from the carrier body region 16 of the adapter 13, but are arranged substantially in the same radial distance range from the center or from the axis of rotation 19 of the assembly as the carrier body region 16. Otherwise, however, the embodiment according to FIGS. 8A-8D corresponds functionally to the embodiment according to FIGS. 2 to 7, in particular as regards the self-centring by the possibility of the variable radial relative positioning 27 of the support arms 14 in the support cutouts 15 on account of the clearance 27, and as regards the pitch circle independence of the driving body 12 and adapter 13 when they are pressed together.

Figures 8A, 8B, 8C:
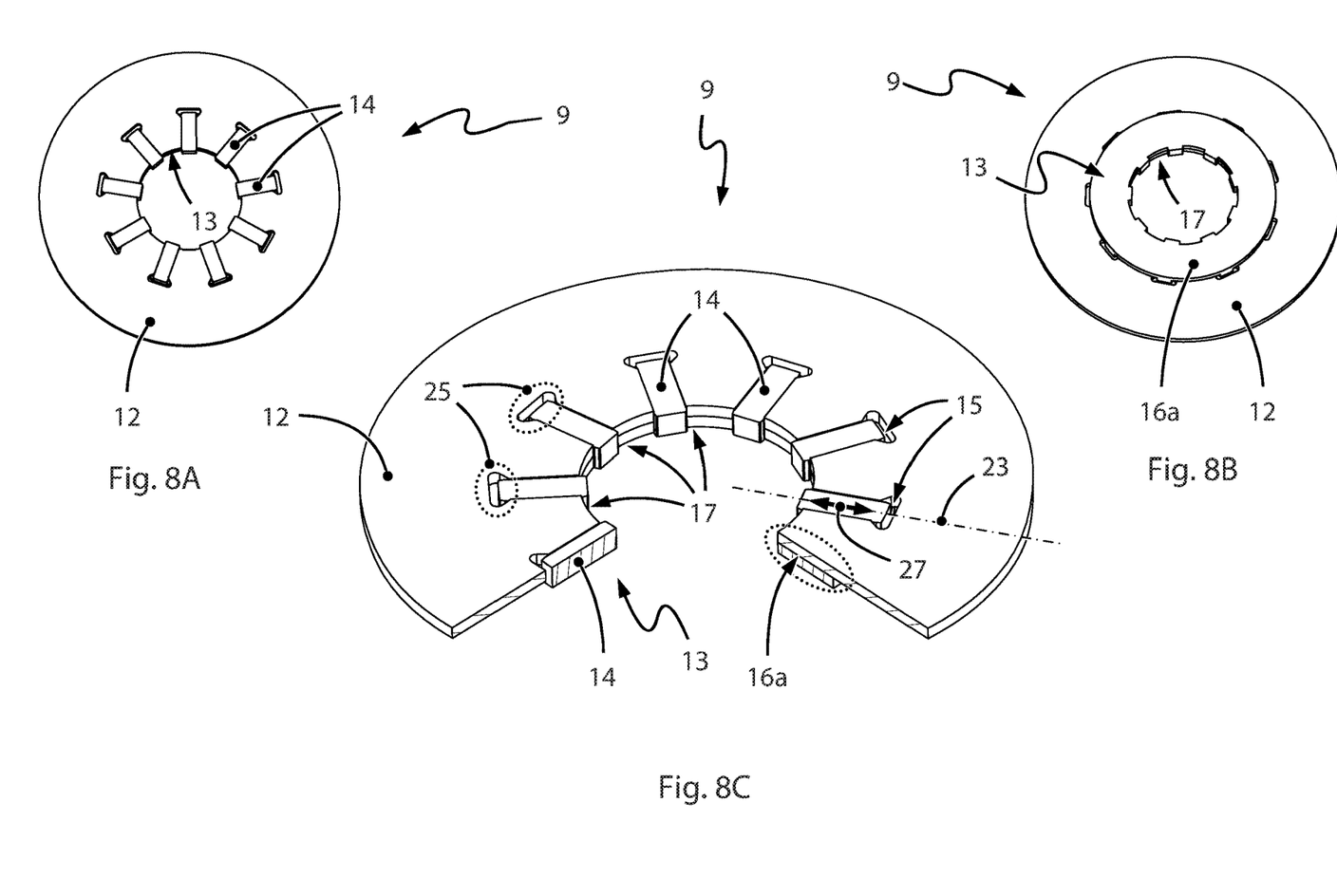
FIGS. 8A-8D shows an embodiment of a torque transmission assembly having a driving body and disc-like adapter in various views.
Figure 8D:
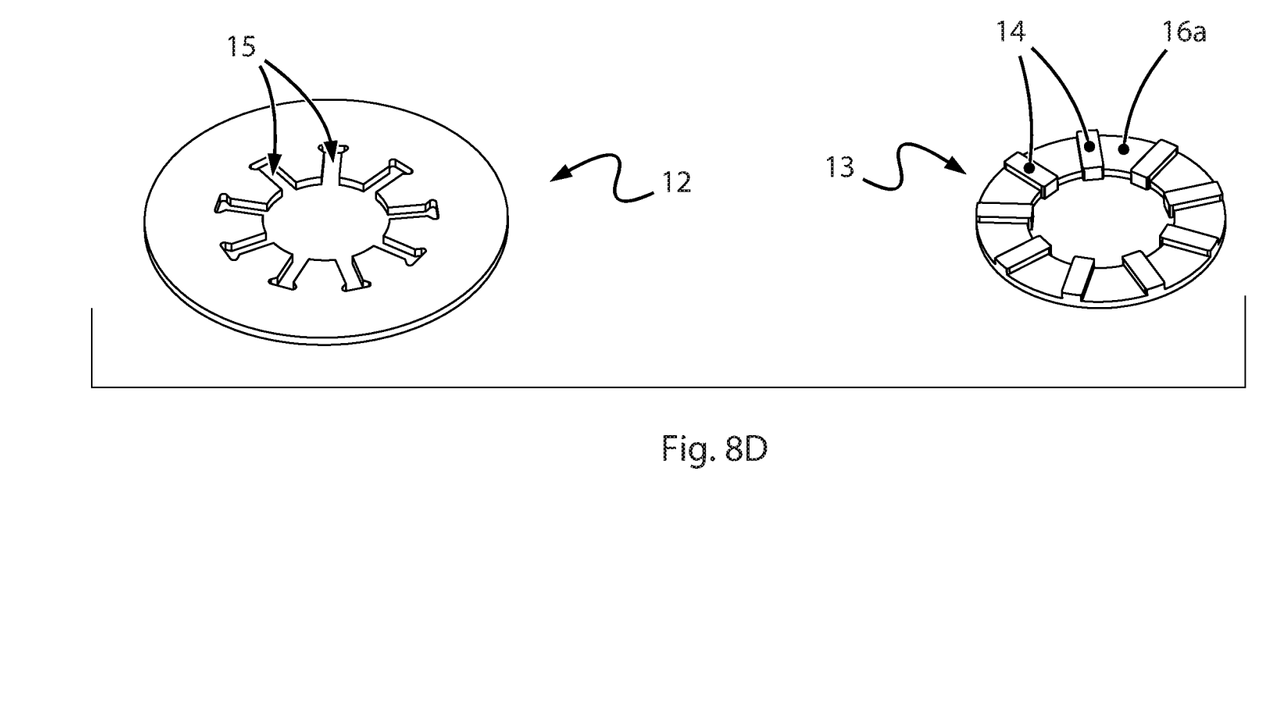

The torque transmission assembly 9 according to FIG. 8, similar to the adapter 13 (cf. FIG. 4) of the torque transmission assembly according to FIGS. 2 to 7, again has a torque transmission profile 17, via which torque introduced for example from the driving body 12 can be transmitted via the adapter 13 to an adjacent component, for example to a freewheel driver (cf. FIG. 12), to a bicycle crank or to a bicycle hub (cf. FIG. 1).

In the embodiment according to FIG. 8, there is also an additional support action on account of the abutment of a carrier surface 16a of the adapter 13 directly against the associated counterpart surface of the driving body 12, as is apparent for example at the point, marked by a dotted line, at 16a in FIG. 8. This can increase or further improve the loadability of the connection between the driving body 12 and adapter 13 and the true running of the torque transmission assembly 9 formed in this way.

Figure 9:
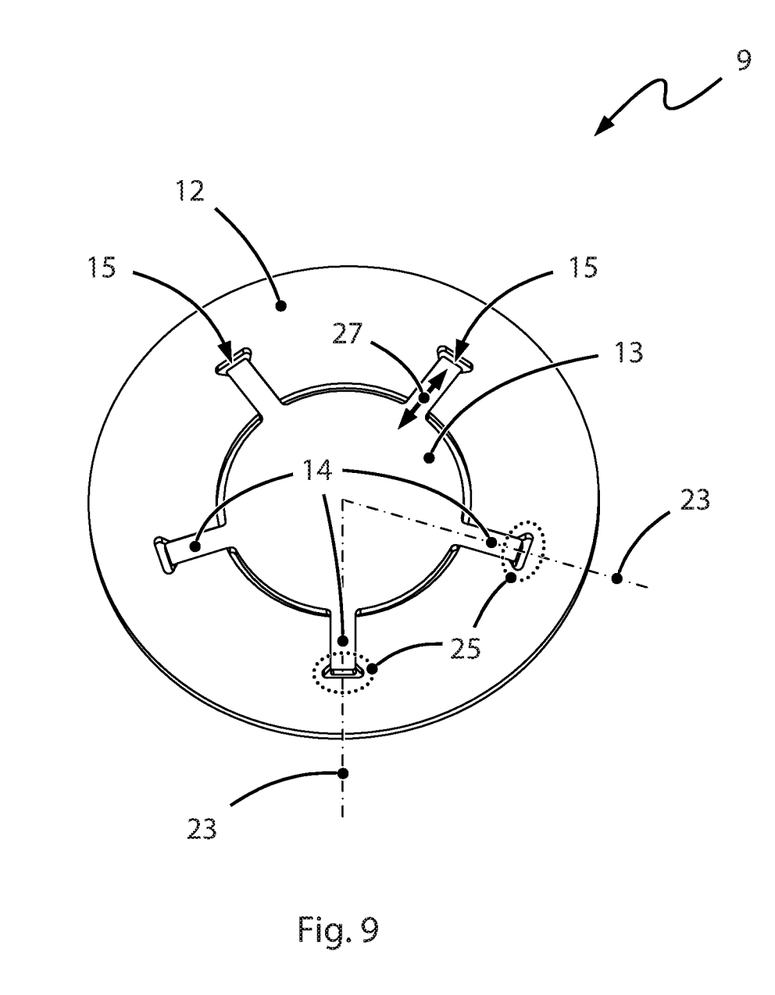
FIG. 9 shows a schematic illustration of an embodiment of a torque transmission assembly having an adapter and an external driving body.
Figure 10:
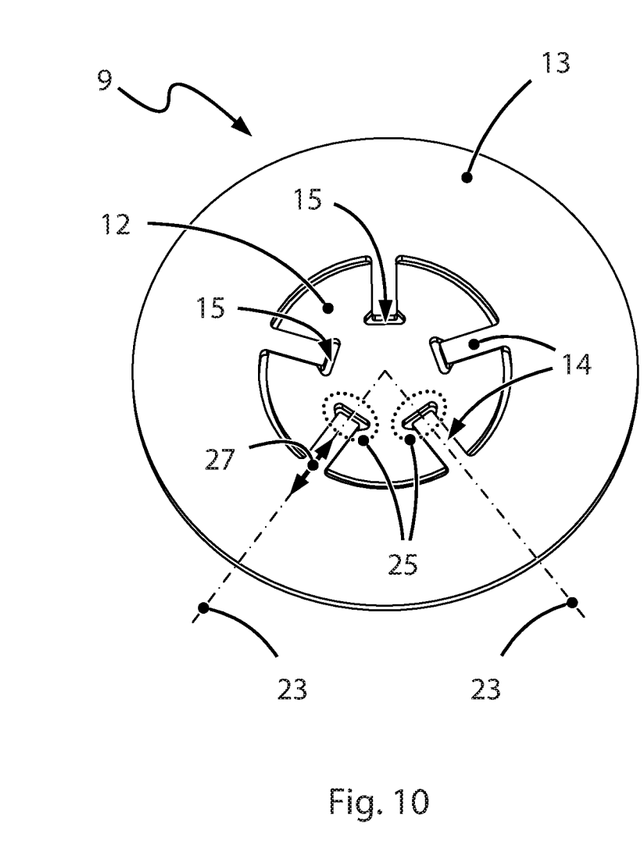
FIG. 10 shows a schematic illustration of an embodiment of a torque transmission assembly having an adapter and an internal driving body.

FIGS. 9 and 10 show highly schematic illustrations of additional embodiments of torque transmission assemblies 9, which each again comprise a driving body 12 and an adapter 13, wherein, in these embodiments, both the driving body 12 and the adapter 13 are formed in a completely flat manner. As in the above-described embodiments, the adapter 13 has, here too, a plurality of radially extending support arms 14, and the driving body 12 has a plurality of support cutouts 15 of complementary position and shape to the support arms 14.

The support arms 14 have again been pressed into the support cutouts 15, wherein there is a clearance 25 in each case in the radial directions 23 between the support arm 14 and support cutout 15, as described above in particular with reference to FIG. 7. Here too, self-centring is thus again realized as a result of the possibility of the variable radial relative positioning 27 of the support arms 14 in the support cutouts 15, and pitch circle independence of the press connection between the driving body 12 and adapter 13.

The difference between the embodiments according to FIG. 9 and FIG. 10 is that, in the embodiment according to FIG. 9, the driving body 12 is arranged radially on the outside with respect to the adapter 13, while, in the embodiment according to FIG. 10, the driving body 12 is arranged radially on the inside with respect to the adapter 13. In both cases, however, the pressed-together components of driving body 12 and adapter 13 form a torque transmission assembly 9 according to the present disclosure.

Figure 11:
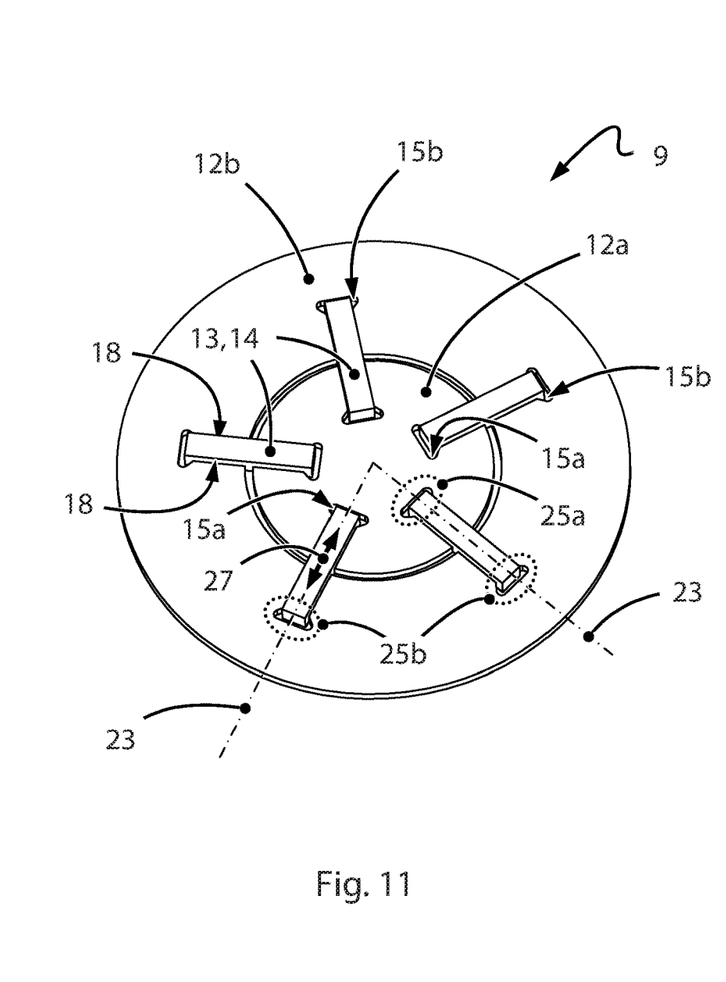
FIG. 11 shows a schematic illustration of an embodiment of a torque transmission assembly having an adapter and two driving bodies.
Figure 12:
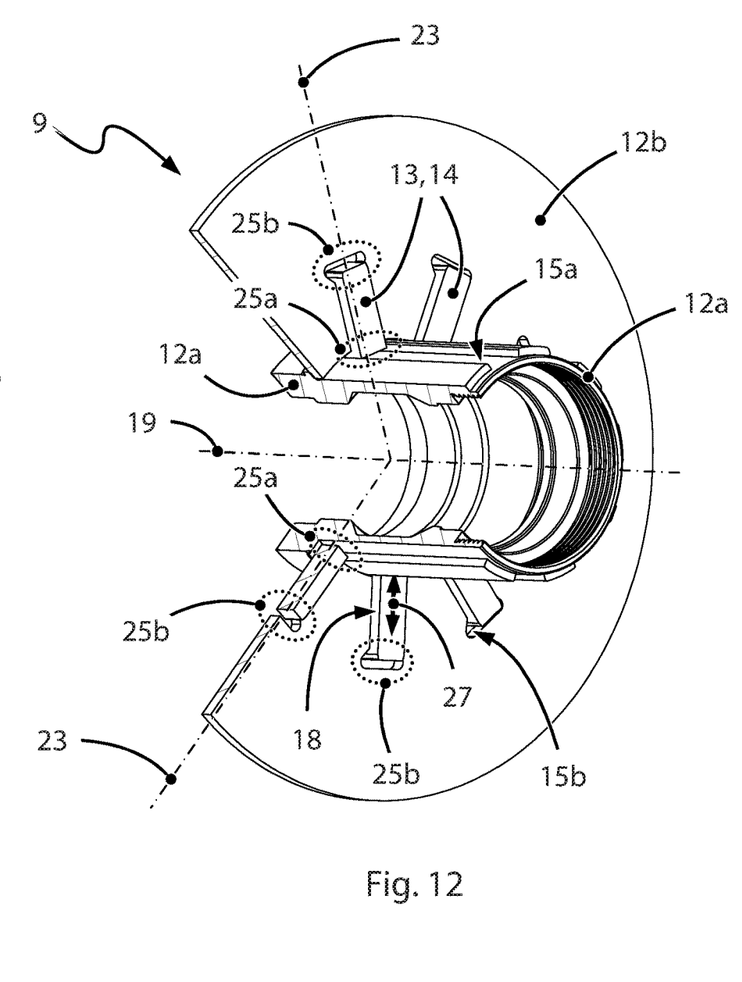
FIG. 12 shows a schematic illustration of an embodiment of a torque transmission assembly having an adapter and two driving bodies.

The likewise schematically illustrated embodiments according to FIGS. 11 and 12 correspond in terms of their design and functional principle to the above embodiments as regards main properties, in particular with the embodiments according to FIGS. 9 and 10. Apparent again is a driving body 12, adapter support arms 14, driving body support cutouts 15 and a clearance 25 between the end of the support arm 14 and the runout of the associated support cutout 15 in the radial direction 23.

A difference from the above-described embodiments is, in the embodiments according to FIGS. 11 and 12, rather than one driving body, two are present, specifically an inner driving body 12a and an outer driving body 12b. This means that the adapter or the adapter device 13 in the embodiments according to FIGS. 11 and 12 is not in one piece as in the above-described embodiments, but is in the form of a plurality of initially loose cuboid pegs. In other words, the intrinsically loose cuboid pegs in this case form not only the support arms 14 but, taken together, at the same time the entire adapter 13.

In the embodiments according to FIGS. 11 and 12, there is a clearance 25a and 25b, respectively, both between the radially internally arranged support cutouts 15a and the local ends of the cuboid pegs forming the support arms 14, and between the radially externally arranged support cutouts 15b and the local ends of the cuboid pegs forming the support arms 14.

In this way, as described above inter alia with reference to FIG. 7, it is also possible in the embodiments according to FIGS. 11 and 12 to easily compensate any size tolerances, for example hardening warpage and the like, during the joining or pressing-together of the adapter device 13 and the driving bodies 12a and 12b.

The self-centring action, described above in particular with reference to FIGS. 5 to 7, during the pressing operation (here both with regard to the inner driving body 12a and to the outer driving body 12b) and the double function either of the fitting surfaces 18 of the support arms 14 or of the fitting surfaces 22 (cf. FIG. 6) of the support cutouts 15 as a punching or frictional tool, with which the respective counterpart fitting surfaces are finished simultaneously with the pressing operation, is also present in the embodiments according to FIG. 11 and FIG. 12. This is because, although each of the cuboid pegs that form the support arms 14 and are in this case loose is inherently arrangeable largely in a freely variable manner in the radial direction 23 by the size of the clearance 25a/b, the relative position, which is always exactly defined in the circumferential direction by the fitting surfaces 18 (FIGS. 11-12) and 22 (cf. FIG. 6), between the driving bodies 12a, 12b and the cuboid pegs that form the adapter 13 always results, here too, in an inevitably exactly concentric arrangement of the inner driving body 12a and outer driving body 12b.

In the embodiment according to FIG. 12, the radially inner driving body 12b is a freewheel driver for a rear hub 8 on a bicycle 1 (cf. FIG. 1). It is apparent that, in this way, a driving body 12b, which may be for example a cassette sprocket 10 or a sprocket spider 12 (cf. FIG. 2-3), can be connected firmly in a torque transmitting manner to the freewheel driver 12a. As in the embodiments described above, this connection is also fault-tolerant and low-tension, and, on account of the above-described self-centring, runs in principle true even when parts of the assembly exhibit manufacturing tolerances or warpage as a result of heat treatment.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A torque transmission assembly for a bicycle, comprising:
    an adapter device, the adapter device having a plurality of support arms, the plurality of support arms extending with a radial direction component; and
    at least one driving body rigidly connectable to the adapter device in a torque transmitting manner, the at least one driving body including a complementary plurality of support cutouts of complementary position and shape to the plurality of support arms,
    wherein a support arm of the plurality of support arms is received in a support cutout of the at least one driving body, forming a press fit,
    the press fit of the support arm and the support cutout having two fitting planes which are parallel to one another and to an imaginary plane containing the axis of rotation of the torque transmission assembly, and
    a clearance existing between the support arm and support cutout along the radial direction component.

2. The torque transmission assembly of claim 1, wherein the imaginary plane forms a center plane with respect to the two fitting planes.

3. The torque transmission assembly of claim 1, wherein the adapter device is formed in one piece and includes a carrier body, arranged radially internally, and the plurality of support arms are arranged projecting radially outwards in a region of an outer circumference of the carrier body.

4. The torque transmission assembly of claim 1, wherein the adapter device is formed in one piece and includes a carrier body, arranged radially externally, and the plurality of support arms are arranged projecting radially inwards in a region of an inner circumference of the carrier body.

5. The torque transmission assembly of claim 1, wherein the plurality of support arms of the adapter device is arranged on a carrier surface for a portion of each support arm of the plurality of support arms.

6. The torque transmission assembly of claim 1, wherein the at least one driving body includes two driving bodies that are arrangeable coaxially having a radial spacing between, and
    the two driving bodies having support cutouts, wherein the plurality of support arms are shaped as cuboid pegs, and wherein each cuboid peg includes a first end engaging with a first support cutout of the driving body arranged radially internally and with a second end in a second support cutout of the driving body arranged radially externally.

7. The torque transmission assembly of claim 4, wherein the at least one driving body arranged radially internally is a freewheel driver of a bicycle rear hub.

8. The torque transmission assembly of claim 1, wherein the adapter device has a torque transmission interface arranged radially on an inside surface.

9. The torque transmission assembly of claim 1, wherein the adapter device is formed in a cupped manner such that the imaginary planes of a carrier body and of the support arms are arranged spaced apart from one another along the axis of rotation.

10. The torque transmission assembly of claim 1, wherein the at least one driving body is formed in a cupped manner such that the two fitting planes and a radially inner runout of the support cutouts are arranged spaced apart from one another along the axis of rotation.

11. The torque transmission assembly of claim 1, wherein the support cutouts of the at least one driving body are circumferentially closed.

12. The torque transmission assembly of claim 1, wherein the at least one driving body is arranged radially externally with respect to the adapter device, and is a spider for receiving at least one chain wheel of a bicycle drivetrain.

13. The torque transmission assembly of claim 1, wherein the at least one driving body is arranged radially externally with respect to the adapter device, and is a chain wheel of a bicycle drivetrain.

14. The torque transmission assembly of claim 1, wherein the adapter device has five support arms, and the at least one driving body correspondingly has five support cutouts.

15. The torque transmission assembly of claim 1, wherein a first material hardness of the adapter device is greater than a second material hardness of the at least one driving body in a region of the two fitting planes.

16. The torque transmission assembly of claim 1, wherein a first material hardness of the adapter device is less than a second material hardness of the at least one driving body in a region of the two fitting planes.

17. A method for producing a torque transmission assembly, the method comprising:
 a. producing at least one driving body and an adapter device such that first fitting surfaces of support arms form an interference fit at least in the tolerance zone range S to Z with second fitting surfaces of driving body support cutouts;
 b. positioning the adapter device and at least one driving body axially on top of each other along an assembly axis of rotation, such that the support arms cover the driving body support cutouts;
 c. pressing the adapter device and at least one driving body together along the assembly axis of rotation, with a chip formation at the first and the second fitting surfaces.

* * * * *